(12) United States Patent
Evans (10) Patent No.: US 7,168,128 B2
(45) Date of Patent: Jan. 30, 2007

(54) WAND ASSEMBLY FOR A DOMESTIC APPLIANCE

(75) Inventor: Nicholas Alexander Evans, Andover (GB)

(73) Assignee: Dyson Technology Limited, Wiltshire (GB)

( * ) Notice: Subject to any disclaimer, the term of this patent is extended or adjusted under 35 U.S.C. 154(b) by 236 days.

(21) Appl. No.: 10/683,390

(22) Filed: Oct. 14, 2003

(65) Prior Publication Data

US 2004/0111828 A1    Jun. 17, 2004

Related U.S. Application Data

(62) Division of application No. 10/468,469, filed as application No. PCT/GB02/00850 on Feb. 27, 2002.

(30) Foreign Application Priority Data

Mar. 8, 2001    (GB)    ................................ 0105781.9

(51) Int. Cl.
*A47L 9/24* (2006.01)
(52) U.S. Cl. ............................ 15/414; 15/144.4; 285/7
(58) Field of Classification Search .................. 15/377, 15/414; 16/113.1, 429; 285/7, 145.1
See application file for complete search history.

(56) References Cited

U.S. PATENT DOCUMENTS

| | | | | |
|---|---|---|---|---|
| 942,490 | A * | 12/1909 | Dunn ........................... | 135/75 |
| 2,660,457 | A * | 11/1953 | Mallon .......................... | 285/7 |
| 2,984,852 | A * | 5/1961 | George ...................... | 15/144.4 |
| 3,083,041 | A | 3/1963 | Owenmark | |
| 3,153,252 | A * | 10/1964 | Ricciardi .................... | 15/144.4 |
| 3,407,424 | A * | 10/1968 | Lanzarone et al. ............ | 15/145 |
| 3,866,257 | A * | 2/1975 | Cansdale, Sr. ........... | 15/230.11 |
| 4,135,274 | A * | 1/1979 | Freeman ..................... | 15/244.1 |
| 4,325,157 | A * | 4/1982 | Balint et al. ................ | 15/144.4 |
| 4,653,142 | A * | 3/1987 | Upton .......................... | 16/429 |
| 5,360,111 | A | 11/1994 | Arispe et al. | |
| 5,375,938 | A | 12/1994 | Bartlow | |
| 5,462,311 | A * | 10/1995 | Cipolla .......................... | 285/7 |
| 5,661,868 | A | 9/1997 | Panagakos et al. | |

(Continued)

FOREIGN PATENT DOCUMENTS

DE    6752338 U    2/1969

(Continued)

OTHER PUBLICATIONS

European Search report dated Apr. 4, 2005, directed to a counterpart foreign application.

*Primary Examiner*—Terrence R. Till
(74) *Attorney, Agent, or Firm*—Morrison & Foerster LLP (57) ABSTRACT

A wand for a domestic appliance (e.g., a vacuum cleaner) includes a plurality of tubes which are dimensioned to telescope inside one another. Each tube is associated with a securing mechanism for securing the tube in an extended position with respect to another of the tubes. Adjacent securing mechanisms are positioned on their respective tubes such that, when the tubes are retracted, one securing mechanism presses against another to release the other securing mechanism. Thus, a user does not need to separately operate each securing mechanism when extending the wand. Also, the tubes automatically secure themselves in an extended position with respect to one another. A hook on the widest tube cooperates with a collar on the narrowest tube to retain the tubes in a stored position.

24 Claims, 12 Drawing Sheets

U.S. PATENT DOCUMENTS 5,797,162 A     8/1998   Vystrcil et al.
5,836,620 A     11/1998  Wang et al.
6,006,399 A  *  12/1999  Massaro ................... 15/315
6,032,328 A     3/2000   Harmon et al.
6,148,474 A  *  11/2000  Ohara et al. ............... 15/377
6,154,918 A  *  12/2000  Cain et al. ................ 15/327.5
6,213,672 B1 *  4/2001   Varga ..................... 403/109.2
6,393,646 B1 *  5/2002   Beers et al. .............. 15/144.4
6,415,470 B1 *  7/2002   Ramrattan ................. 15/144.4
6,431,607 B1 *  8/2002   Kittelmann et al. ......... 285/7
6,461,074 B2    10/2002  Taylor

FOREIGN PATENT DOCUMENTS

| | | |
|---|---|---|
| EP | 0246712 A | 11/1987 |
| EP | 0893089 | 1/1999 |
| FR | 2566651 A1 | 1/1986 |
| JP | S48-064016 | 9/1973 |
| JP | S63-202250 | 12/1988 |
| JP | 1989-256906 | 10/1989 |
| JP | H06-045191 | 6/1994 |
| JP | H08-294472 | 11/1996 |
| JP | H11-235298 | 8/1999 |
| JP | 2000-23887 | 1/2000 |
| WO | WO-96/24000 A1 | 8/1996 |

\* cited by examiner

WAND ASSEMBLY FOR A DOMESTIC APPLIANCE

REFERENCE TO RELATED APPLICATIONS

This application is a division of Ser. No. 10/468,469, filed Aug. 20, 2003, pending, which is the national stage under 35 USC 371 of International Application No. PCT/GB02/00850, filed Feb. 27, 2002, the entire contents of which are incorporated by reference herein.

FIELD OF THE INVENTION

The invention relates to a telescopic wand assembly for a domestic appliance. The wand assembly is particularly, but not exclusively, useful for a vacuum cleaner.

BACKGROUND OF THE INVENTION

Cylinder vacuum cleaners generally comprise a main cleaner body which is dragged along by a user. The main body contains separating apparatus for separating dirt and dust from an airflow. Airflow is introduced to the main body via a hose and wand assembly which is manipulated by a user, a cleaning tool normally being attached to the distal end of the wand. The hose and wand assembly comprises a length of flexible hose which is attached to the main body of the cleaner and a rigid wand. The wand typically has two tubes which are telescopically connected to one another. One of the tubes is rigidly connected to a handle and the other tube telescopes within that tube. Some form of locking device or ratchet mechanism is provided for securing the two tubes in a particular position with respect to one another. In this way, the overall length of the wand is adapted to suit the physical dimensions (height or arm length) of the user. An example of this type of wand is shown in U.S. Pat. No. 3,083,041.

There is a trend for vacuum cleaners to be made more compact so that they can be more conveniently stored. While there have been many examples of cleaners with a compact cleaner body, most of these cleaners are still supplied with a bulky two-stage wand which is difficult to store during those times when the cleaner is not required. From a packaging point of view, the size of the wand often defines the minimum size of box which is required to ship the product.

It is known to provide a wand with three stages. By providing a higher number of stages the overall length of the wand, when the wand has been fully collapsed, is shorter than with a two stage wand. However, the provision of a wand with three or more stages increases the complexity of the wand for a user. In particular, it can be more time consuming and confusing to extend the wand for use and to retract the wand for storage.

SUMMARY OF THE INVENTION

The present invention seeks to provide a telescopic wand assembly which is more convenient to manipulate.

Accordingly, a first aspect of the present invention provides a wand for a domestic appliance comprising a plurality of tubes which are dimensioned to telescope inside one another, each tube being associated with a securing mechanism for securing the tube in an extended position with respect to another of the tubes, the securing mechanisms being arranged such that one securing mechanism releases another when the tubes are retracted.

By providing securing mechanisms which operate one another, a user does not need to separately operate each individual securing mechanism to collapse the wand. Thus, a wand can be provided with a larger number of stages, which allows the wand to be retracted to a short overall length, without the additional complexity that such a wand would usually present for a user.

Preferably, each securing mechanism is capable of moving between a locked position, in which it locks the tube with which it is associated to an adjacent tube, and an unlocked position, in which it allows movement between the said tubes. Adjacent securing mechanisms are positioned on their respective tubes such that, when the tubes are retracted, one securing mechanism presses against another to unlock the other securing mechanism. Thus, there is no need for the securing mechanisms to be linked to one another, which would incur an inconvenient level of cost and complexity; rather, the securing mechanisms operate one another in a mechanically simple and therefore reliable manner.

Preferably, each securing mechanism comprises a projection which locates in a depression on the outer surface of the tube to be locked. The depression can be formed by shaping the tube or by forming an aperture in the wall of the inner tube. The projection can be carried by an arm which lies alongside the tube.

Preferably the arms are pivotally mounted about the tube. This causes the projections to move in a radial direction. The pivotal mounting of the arms can be achieved by manufacturing the arms from a material which is resiliently flexible (e.g. Nylon) or by providing each arm as a separate part which can pivot about the tube.

Preferably the surfaces of the securing mechanisms which, in use, press against one another are inclined with respect to the longitudinal axis of the wand whereby to effect the movement of the securing mechanisms.

It is also desirable that the securing mechanisms of the wand should automatically secure the tubes of the wand in an extended position as the wand is brought into an extended position, i.e. a user does not need to operate each securing mechanism individually in order to secure the tubes in the extended position.

This can be achieved by providing a collar of increased diameter adjacent the end of a tube. The projection on the securing mechanism is, in use, temporarily displaceable by the collar so as to accommodate and retain the collar within a cavity which is defined by the securing mechanism and tube. Alternatively, the projection can simply seat itself in a depression in the inner tube as the tubes are brought into the extended position. The depression can be formed by shaping the tube or by forming an aperture in the wall of the inner tube.

Preferably the wand incorporates means for preventing rotation of the tubes with respect to one another. Thus, in use, a user will be able to control the position of a tool on the distal end of the wand. This can be achieved by providing a ridge which extends in an axial direction along the tube and a channel which extends in an axial direction along each securing mechanism.

Preferably, one of the securing mechanisms is manually operable. A manually operated control can be provided on the widest of the tubes, i.e. the tube which accommodates all of the other tubes when the wand is in a fully retracted position. Conveniently, the control can be located on, or adjacent to, a handle for manipulating the wand.

Preferably, one of the tubes comprises a plurality of alternative locking positions for that tube with respect to another of the tubes. This allows a user to adjust the overall length of the wand to suit their own physical requirements.

Preferably, the widest of the tubes comprises means for retaining the plurality of tubes in a stored position within the widest tube. This can take the form of a hook for retaining a collar on the narrowest tube when the tubes are stored. The hook can be operated automatically as the tubes are moved into the stored position.

Preferably, the distal end of the narrowest tube comprises means for housing at least some of the securing mechanisms when the tubes are fully retracted. This can take the form of a cap which houses the securing mechanisms.

A further aspect of the invention provides a wand for a domestic appliance comprising a plurality of tubes which are dimensioned to telescope inside one another, each tube being associated with a securing mechanism for securing the tube in an extended position with respect to another of the tubes, the securing mechanisms being arranged such that each securing mechanism automatically secures the tubes in an extended position with respect to one another when the tubes are extended. Thus, a user does not need to operate each securing mechanism individually in order to secure the tubes in an extended position.

A further aspect of the invention provides a wand for a domestic appliance comprising a plurality of tubes which are dimensioned to telescope inside one another, and wherein the widest of the tubes comprises retaining means for cooperating with the narrowest of the tubes so as to retain the plurality of tubes in a stored position within the widest tube. Ordinarily, the locking arrangement on a two tube wand allows the two tubes to be locked in any position with respect to one another. Providing retaining means on the widest tube for retaining the plurality of tubes in a stored position allows a simplified securing mechanism to be used on each of the tubes, i.e. a securing mechanism which only has to lock the tubes when the tubes are fully extended. The retaining means serves the function of retaining all of the tubes in a stored position.

Preferably, the narrowest of the tubes comprises a collar and the widest of the tubes comprises a locking mechanism which has a hook for retaining the collar on the narrowest tube when the tubes are stored.

Preferably, the retaining means are operated automatically as the tubes are moved towards the stored position such that a user does not need to operate the retaining means.

Preferably, each tube is associated with a securing mechanism for securing the tube in an extended position with respect to another of the tubes and the distal end of the narrowest tube comprises means for housing at least some of the securing mechanisms when the tubes are fully retracted. This protects the securing means from damage during storage. The securing means may comprise a cap having a longitudinally extending wall defining a cavity for housing the securing mechanisms.

It will be appreciated that these further aspects of the invention can be combined with any of the described/claimed features of the other aspects of the invention.

These arrangements are particularly useful for cylinder or canister type cleaners. However, they can also be used on other types of vacuum cleaners or on other domestic appliances in general, such as a carpet shampooing machine.

BRIEF DESCRIPTION OF THE DRAWINGS

Embodiments of the invention will now be described with reference to the accompanying drawings, wherein:

FIGS. 19 and 20 show, in more detail, tubes of the wand being brought into a locked state; and, FIG. 21 shows a further alternative embodiment of a securing mechanism for the wand.

DETAILED DESCRIPTION OF THE INVENTION

The wand shown in FIGS. 1 to 4 comprises three separate tubes 20, 30, 40 of progressively decreasing diameter such that they can telescope inside one another. The three tubes are retractably housed in a storage tube 10. A handle 12 is connected to storage tube 10 to allow a user to manipulate the wand. A flexible hose 18 extends from section 16 of the storage tube 10 and is connected thereto by a rotating joint 17.

Figure 1:
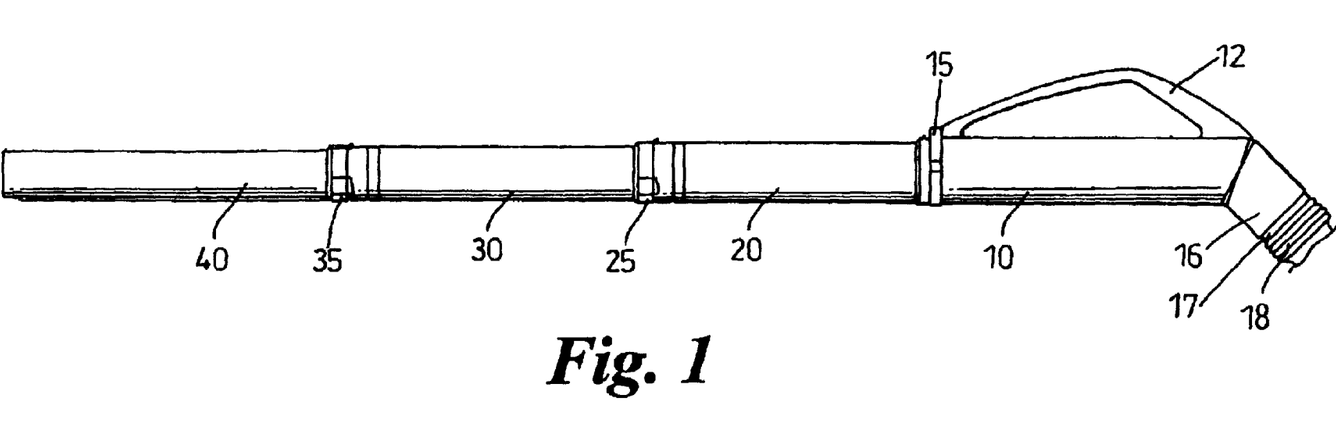
FIGS. 1 and 2 show a wand according to the present invention in an extended state.
Figure 2:
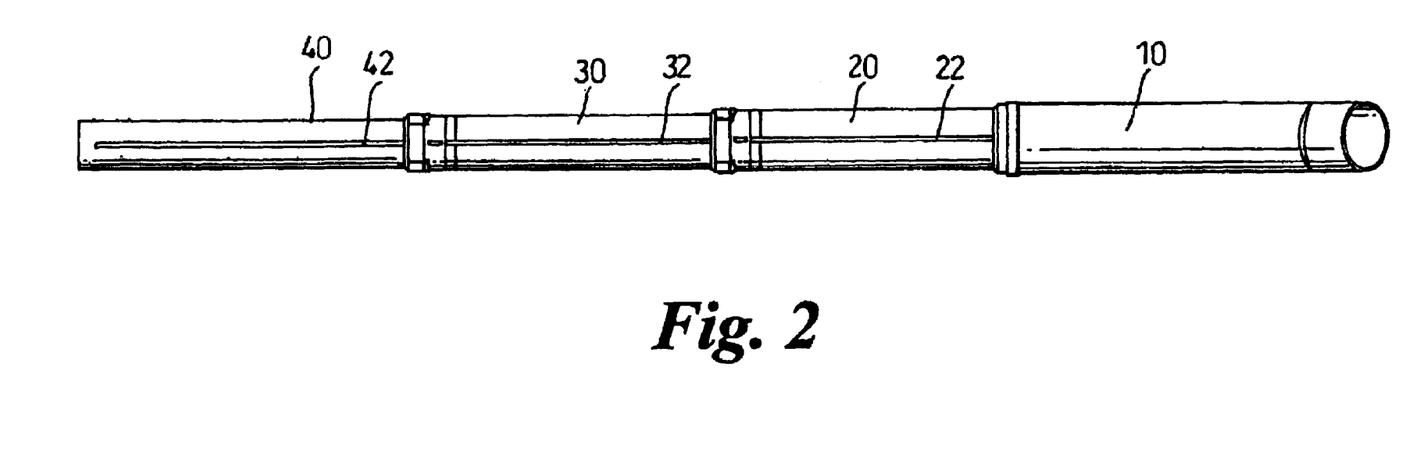
Figure 3:
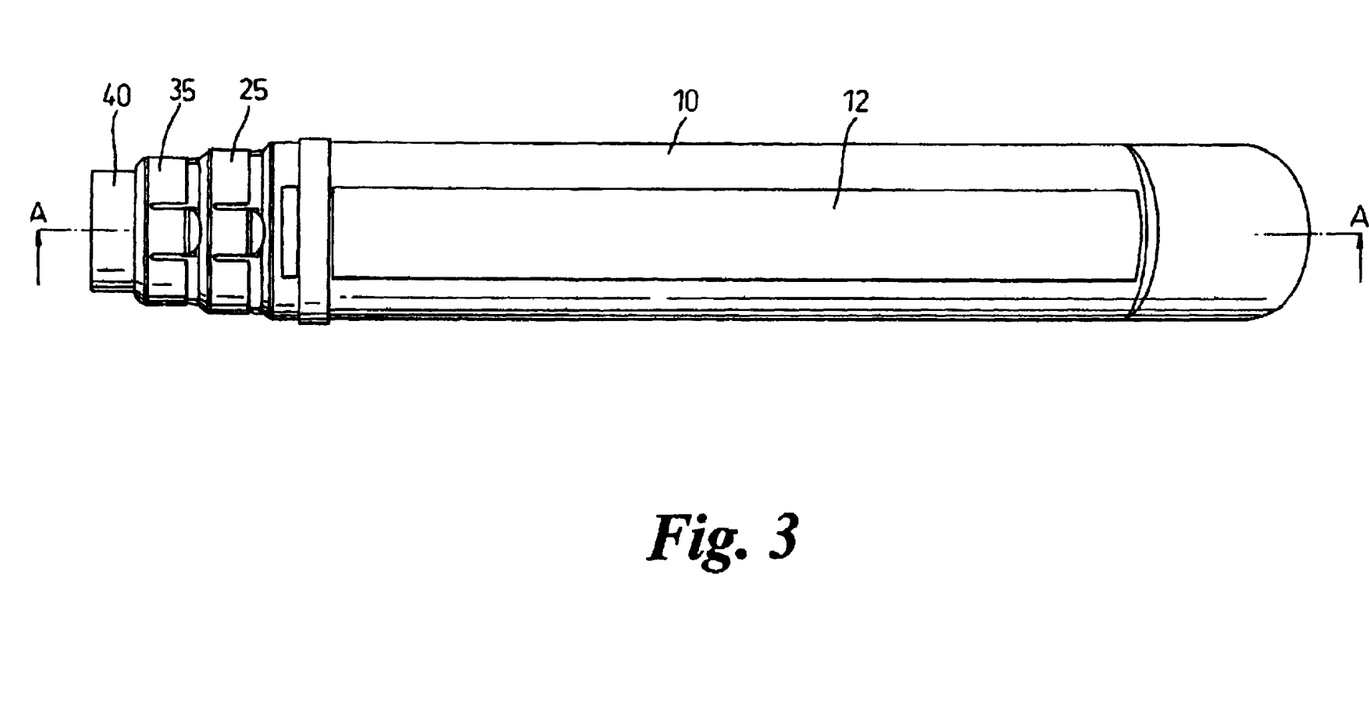
FIG. 3 shows the wand of FIG. 1 in a retracted state.
Figure 4:
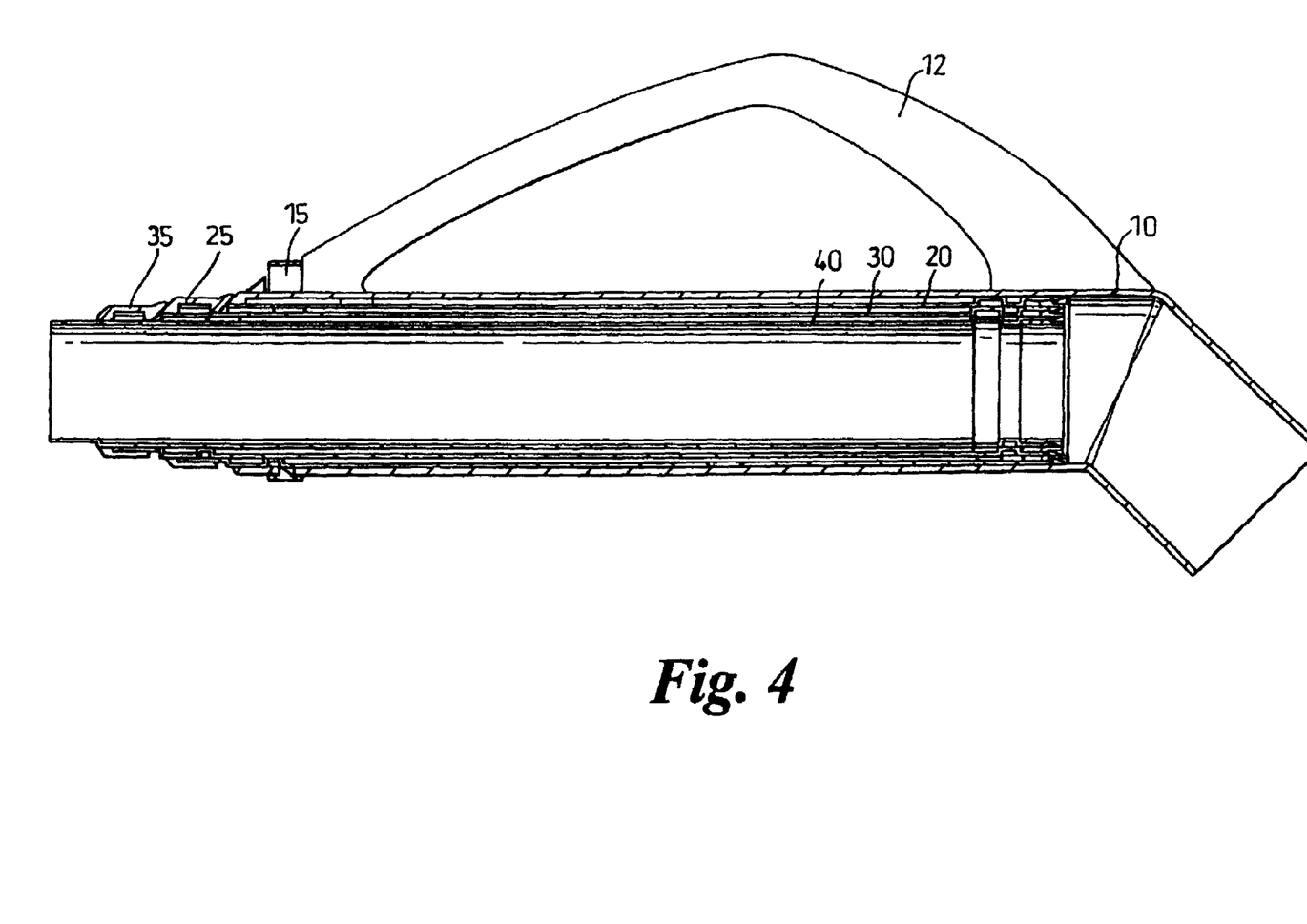
FIG. 4 is a cross-section through the wand of FIG. 3.

The tubes 20, 30, 40 are slideable inside one another and can be moved between a stored position (as shown in FIGS. 3 and 4) and an extended position (as shown in FIGS. 1 and 2) in which one tube is extended from another such that only the ends of the tubes overlap one another. FIG. 4 is a cross section along the line A—A in FIG. 3 showing the tubes in a fully retracted position within storage tube 10. Tubes 20, 30, 40 are progressively narrower in diameter and longer in length. The length of each tube is chosen so that it fully occupies the available length of the storage tube 10 when the securing mechanisms 25, 35 are lying alongside one another.

The distal end of tube 40 is adapted to receive a floor tool (not shown) in any known manner. For example, the floor tool can be connected to the tube 40 by means of an interference fit, interconnecting bayonet fittings, snap-fit connections, a screw threaded collar and sleeve, or by any other suitable means. Accessory tools may also be fitted to the tube 40 in place of the floor tool.

Securing mechanisms 15, 25, 35 are capable of either locking the tubes to one another, as is needed when the tubes are in the extended position shown in FIGS. 1 and 2, or allowing free movement of the tubes with respect to one another, as is needed when the tubes are being retracted into the stored position shown in FIGS. 3 and 4. A securing mechanism 15 is provided on storage tube 10 to secure tube 20 to storage tube 10. Another securing mechanism 25 is provided at the distal end of tube 20 for securing tube 20 to tube 30 and a further securing mechanism 35 is provided at the distal end of tube 30 for securing tube 30 to tube 40.

Figure 5:
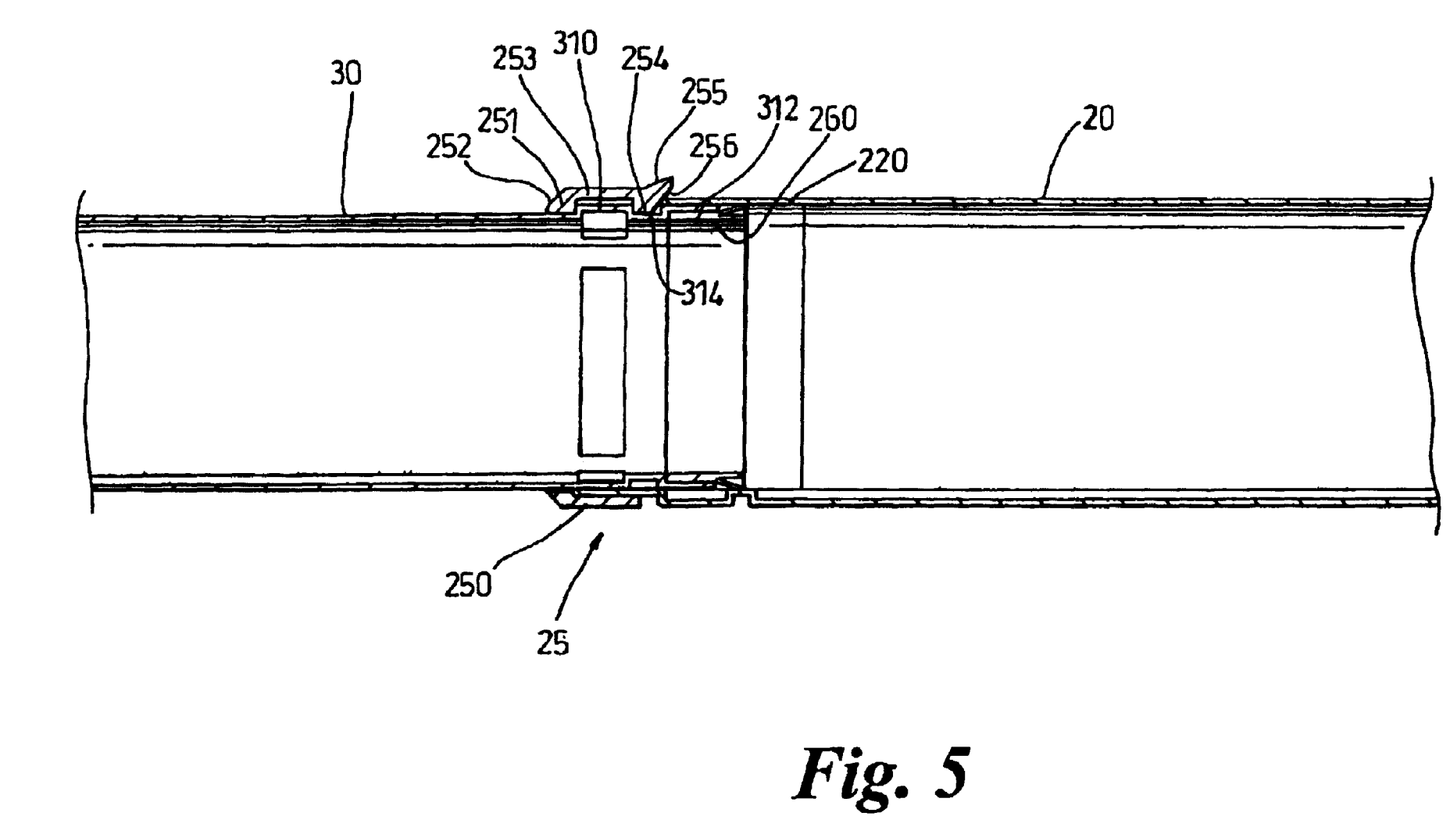
FIG. 5 is a detailed cross-section through a part of the wand of FIG. 1, when the wand is locked in an extended state.
Figure 6:
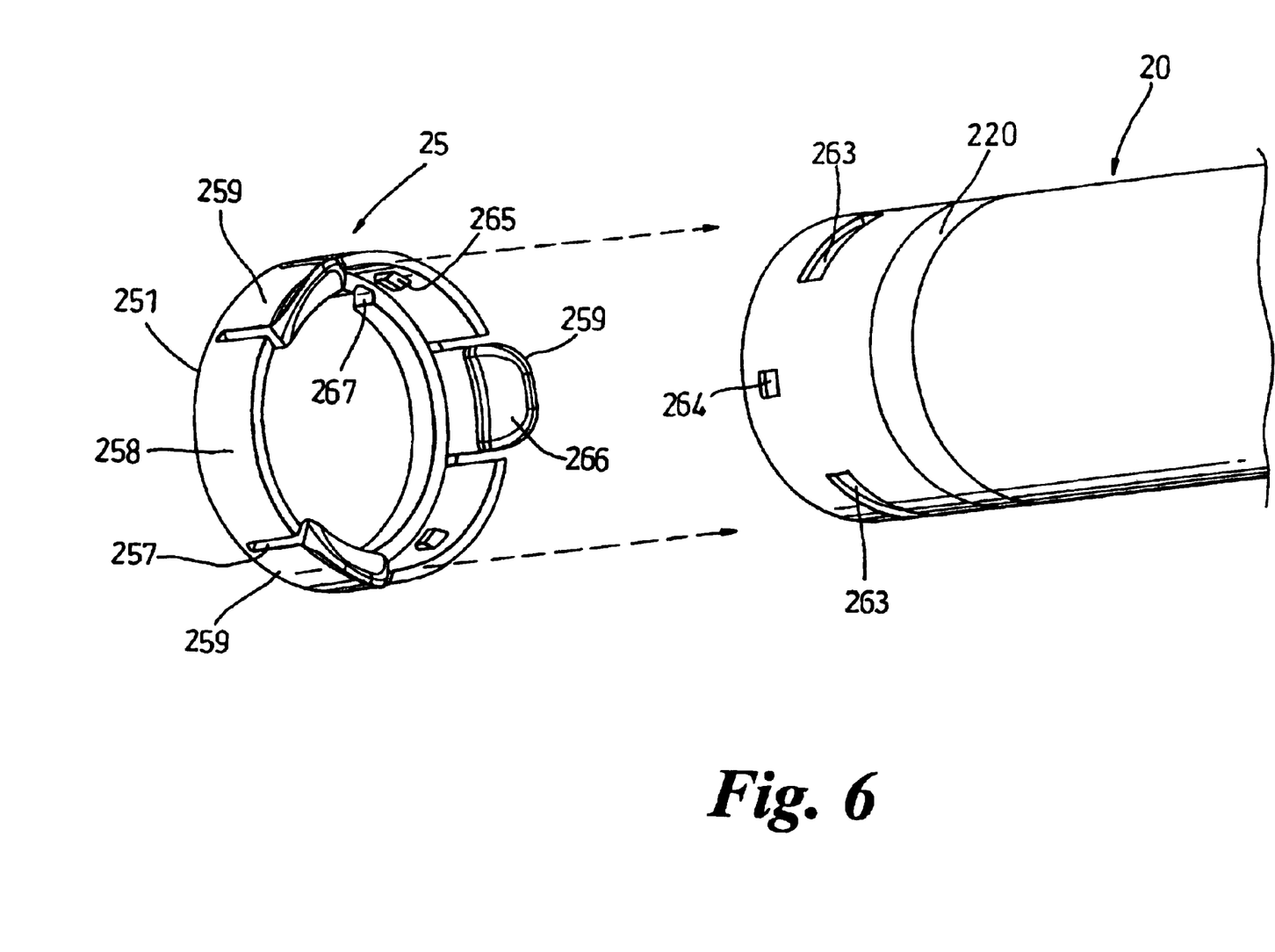
FIG. 6 is a further view of parts of the wand shown in the cross-section of FIG. 5.

FIG. 5 shows the securing mechanism 25 on tube 20 in more detail and FIG. 6 shows an alternative view of the securing mechanism 25 and the end of tube 20. The securing mechanism 35 on tube 30 works in the same manner. The securing mechanism 25 comprises a ring 250 which fits around the outside of tube 20. A first annular portion 251 of the ring 250 projects forwardly from the end of the tube 20 and defines an opening which has a narrower diameter than that of tube 20 itself. This allows the ring 250 to remain in a fixed position with respect to tube 20. The diameter of the opening in annular portion 251, while narrower than tube 20, is large enough to receive tube 30. The first annular portion 251 has an inclined forward surface 252. Axially rearwardly of the first annular portion 251 is a second annular portion 253. The second annular portion 253 comprises a plurality of arms (shown generally as 259 in FIG. 6) which are connected to, and extend axially rearwardly from, the first annular portion 251. Between each arm 259 is an arc-shaped part 258 which fits alongside the outer surface of the tube 20. The arc-shaped parts 258 are also connected to the first annular portion 251 and extend axially rearwardly for a shorter distance than the arms 259. The arc-shaped parts 258 and the arms 259 are circumferentially separated by narrow gaps 257. Three arms 259 are shown, and this has been found to be a preferred minimum number, but other numbers of arms 259 can be provided.

The securing mechanism 25 also has a further set of projections 265. These are retaining features which locate in corresponding apertures 264 on tube 20. The end of tube 30 comprises a collar 310 which has an enlarged diameter compared to the remainder of the tube 30 to the left of the collar. Collar 310 can be formed by shaping tube 30, as shown in FIG. 5, by increasing the thickness of the tube or by securing an additional ring of material around the tube at the place where the collar is required. A seal 260 is provided on each tube for sealing against another tube. The seal 260 is located at one end of tube 30 and is secured to the inner surface of the tube. The seal 260 can be bonded or clipped in place. The rearmost annular portion 312 of tube 30 is shown here as having the same diameter as the collar 310. This is preferable, since portion 312 presses against the adjacent wall of tube 20 and serves to stabilise the tubes and it also allows seal 260 to be supported close to the inner wall of tube 20. However, annular portion 312 could have the same diameter as the remainder of tube 30.

Each of the arms 259 has a radially inwardly extending projection 254 which extends through an aperture 263 in the wall of the tube 20. When the tubes 20, 30 are in the locked position as shown, projection 254 also locates in a depression 314 formed in tube 30 so as to lock the tubes 20, 30 together. The arms 259 also have a radially outwardly extending portion 255 with an inclined face 256. The securing mechanism is manufactured from a material which is sufficiently resilient to permit the arms 259, together with the projections 254, to flex outwardly and return to the position shown without breaking. The collar 310 serves to retain the tube 30 within tube 20 when it is trapped between annular portion 251 and projection 254. Annular portion 314 has a narrower diameter than collar 310 and forms a depression 314 to receive projection 254 of the securing mechanism. To release the tubes 20, 30, the arms 259 are flexed radially outwardly, pivoting about the annular portion 251.

This releases the projections 254 from the depressions 314 in the tube and outside the collar 310. The interior surface 266 of each arm 259 has a concave profile which allows the arm to be readily gripped by a user, should this be necessary.

The seal 260 extends axially and radially beyond the end of the tube such that it can seal against the inner surface of the larger tube 20. The axially end-most portion of tube 20 has a narrower diameter than the remainder of the tube such that seal 260 can fit well against the interior surface of tube 20. The transition in diameter to the narrower end diameter is shown as portion 220 of the tube.

Figure 7:
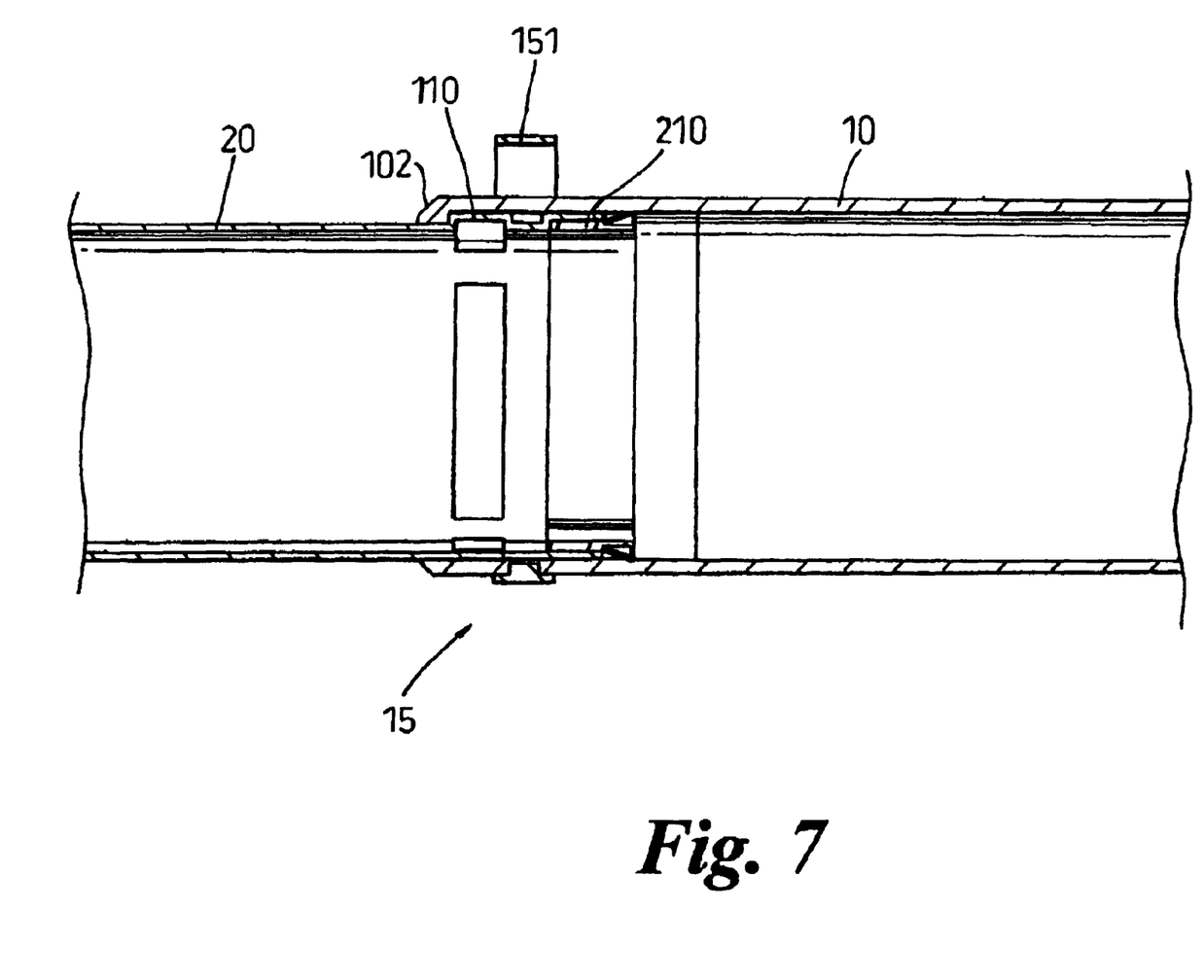
FIG. 7 is a detailed cross-section through another part of the wand of FIG. 1.
Figures 8, 9:
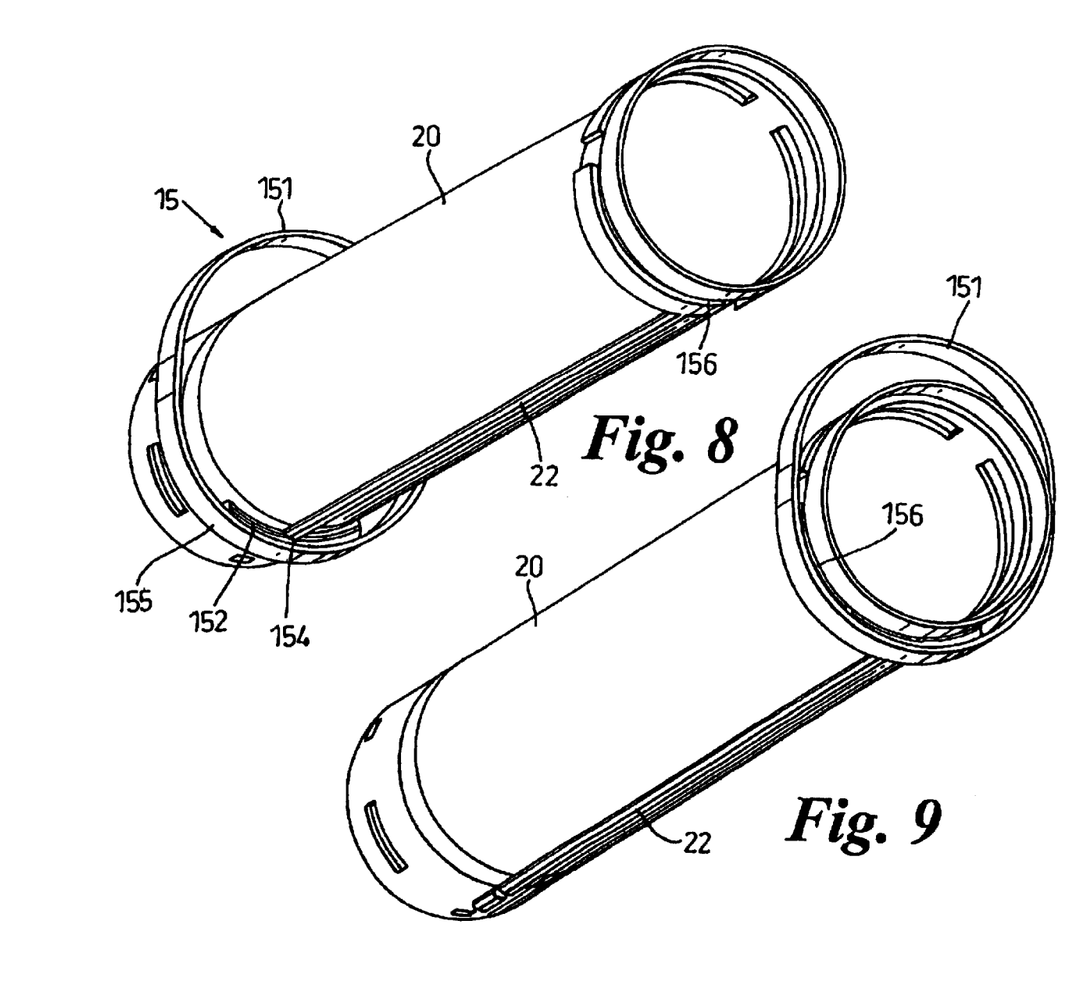
FIGS. 8 and 9 show the locking mechanism on the storage tube of the wand of FIG. 1.

FIGS. 7 to 9 show the securing mechanism on storage tube 10 in more detail. For clarity, only release catch 15 and tube 20 (the tube on which the catch 15 acts) are shown. Release catch 15 comprises a ring shaped member 155 having a portion 151 which projects beyond the wall of storage tube 10 and which can be manually operated to release the catch. Release catch 15 is supported (not shown) by tube 10 such that it can move in a plane which is perpendicular to the longitudinal axis of tube 10. The operative part of the catch 15 is a projection 152 which extends radially inwardly from the ring member 155. As shown in FIG. 9, when tube 20 is fully extended from storage tube 10, projection 152 locates in a channel 156 formed on the outer surface of tube 20 and serves to lock the tubes in this extended position. A notch 154 in the projection 152 accommodates a ridge 22 located on tube 20 and serves to prevent the tubes 10, 20 from twisting with respect to one another. The forward-most portion of storage tube 10 has an inclined face 102 and a diameter which is narrower than both tube 10 and a collar 110 located on tube 20 (similar to collar 310 described above). Thus, collar 110 cannot be withdrawn from storage tube 10. Inclined face 102 serves to unlock securing mechanism 25 when the tubes are collapsed, as will be described more fully below. Seal 210 seals tube 20 to storage tube 10.

It is preferred that the tubes should not twist with respect to one another. As mentioned above, an axially extending ridge 22 is provided along the outer surface of each tube 20, 30, 40. Each securing mechanism has a channel (267, FIG. 6) which can accommodate the ridge. In use, the ridge 22 slides within the channel 267 as the tubes slide with respect to one another but the channel 267 prevents any rotational movement between the tubes. The ridge 22 can be formed as an extrusion simultaneously with the respective tube.

Figure 10:
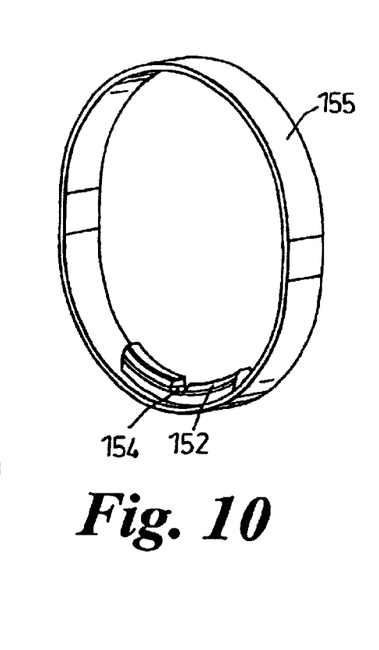
FIG. 10 shows part of the locking mechanism of FIGS. 8 and 9 in more detail.
Figure 11:
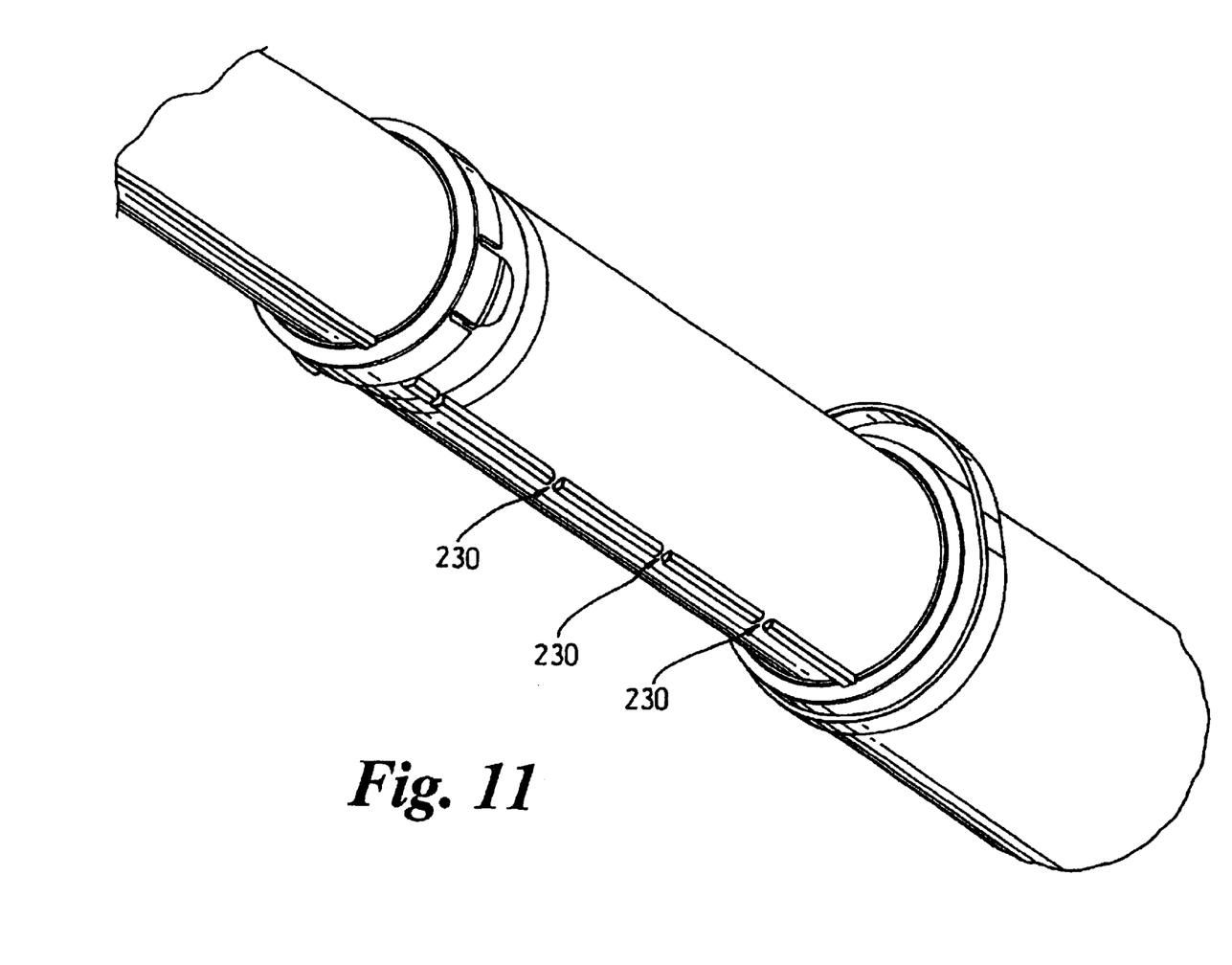
FIG. 11 shows an alternative embodiment of the locking mechanism of FIGS. 8–10.

It is preferable that the wand can be adjustable to a range of different overall lengths such that users who differ in their physical dimensions (height, arm length) can comfortably use the wand. To satisfy this requirement, the uppermost tube 20 is provided with a plurality of alternative locking positions 230, as shown in FIG. 11. Conveniently, these locking positions are provided as notches 230 in the ridge 22 which runs along the length of tube 20. In such an embodiment, the release catch 15 will not include the notch 154 shown in FIG. 10. Instead, projection 152 is continuous so as to be able to locate in one of the locking position notches 230. This will allow the tube 20 to be locked in any one of several different positions with respect to the storage tube 10.

The tubes 10, 20, 30, 40 can be manufactured from a metal such as steel or aluminium, or even a robust plastics material. The tubes are preferably formed from a material of constant thickness, the ridges and channels described above being formed by shaping the respective tube. This has the advantage of minimising the weight of the finished product.

In the above embodiment, the securing mechanisms 15, 25, 35 are manufactured from a resiliently flexible material such as a nylon compound. However, an equivalent pivotal movement of the arms 259 can be achieved by manufacturing each arm 259 as a separate part and providing a pivot between each arm 259 and the remainder of the securing mechanism 25. The resilience of the arm 259 can be achieved by mounting a spring between the arm and the tube or between the arm and a fixed part of the securing mechanism.

While the above described embodiments show the securing mechanisms 25, 35 as being a separate part from the tubes, a securing mechanism could be manufactured integrally with a tube. A plastic securing mechanism could be moulded (or otherwise formed) around a metal tube, or a plastic securing mechanism could be moulded (or otherwise formed) with a plastic tube.

The operation of the wand will now be described. To extend the wand, a user holds storage tube 10 by handle 12 and pulls the narrowest tube 40 axially away from the storage tube 10. Each of the tubes 20, 30, 40 slides outwardly from the storage tube 10.

The order in which the tubes slide out of the storage tube 10 is determined by the amount of friction between adjacent tubes/securing mechanisms and is unimportant. As each tube reaches an extended position with respect to another tube (for example, as tube 30 slides with respect to tube 20 towards the position shown in FIG. 5) the tubes 20, 30 automatically lock in this extended position. Referring to FIG. 5, projection 254 of the securing mechanism 25 is forced radially outwardly as inclined face 256 rides over collar 310 on tube 30. Projection 254 then seats itself in depression 314 in tube 30. Tube 30 is then prevented from sliding any further outwards by annular portion 251 of the securing mechanism abutting against collar 310. Collar 310 is now securely held between the vertical faces of the annular portion 251 and projection 254 and cannot move in either longitudinal direction. Thus, tube 30 is now locked with respect to tube 20. Seal 260 seals against the inwardly tapered portion 220 of tube 20. Tube 40 locks with respect to tube 30 in a similar manner when it reaches its fully extended position. Once the tubes have all locked, the wand is ready for use. It will be appreciated that each of the tubes locks in an extended position in an automatic fashion without requiring a user separately to operate a securing mechanism on each tube.

The procedure for collapsing the wand will now be described. A user firstly operates release catch 15 on storage tube 10. This releases the catch from tube 20. A user moves the distal end of tube 40 axially towards the tube 10. This causes tube 20 to slide within storage tube 10. Once tube 20 has been fully retracted inside the storage tube 10 the securing mechanism 25 pushes against the leading edge 102 of the storage tube 10 (shown in FIG. 7) and causes the arms 259 of the securing mechanism 25 to flex radially outwardly, thus unlocking tube 30 from tube 20. Tube 30 is then able to retract inside the tube 20 until securing mechanism 35 pushes against securing mechanism 25. As before, this causes the arms of the securing mechanism 35 to flex radially outwardly so as to unlock tube 40 from tube 30. As a user continues to move tube 40, tube 40 is able to retract inside tube 30 and the wand is thus fully retracted. The complete wand retraction can be performed in one continuous, swift movement without the need for a user separately to operate each securing mechanism 25, 35.

Figure 12:
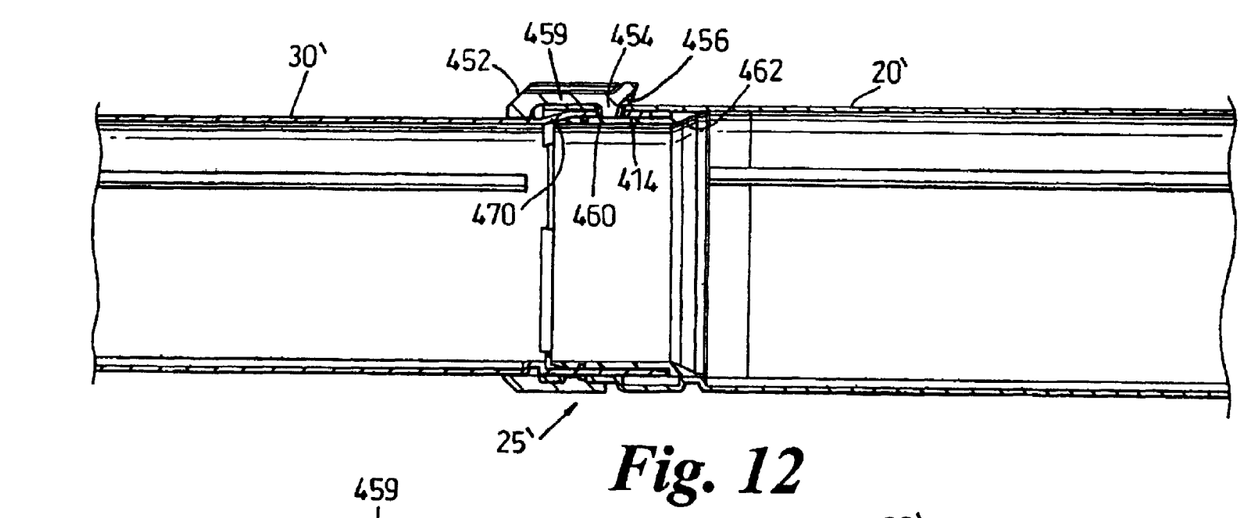
FIG. 12 shows an alternative embodiment of the wand locked in an extended state.
Figure 13:
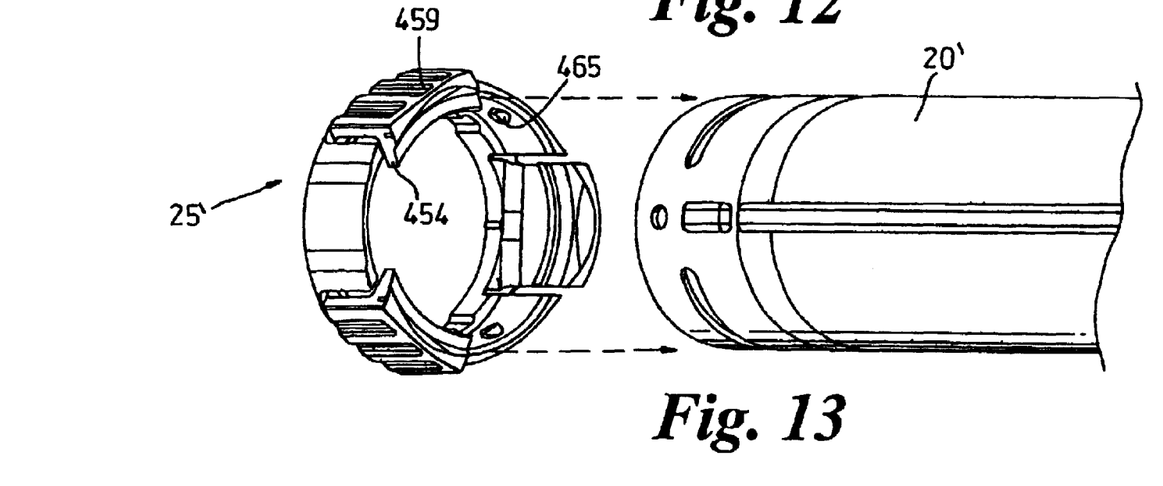
FIG. 13 is a more detailed view of parts of the embodiment shown in FIG. 12.
Figures 19, 20, 21:
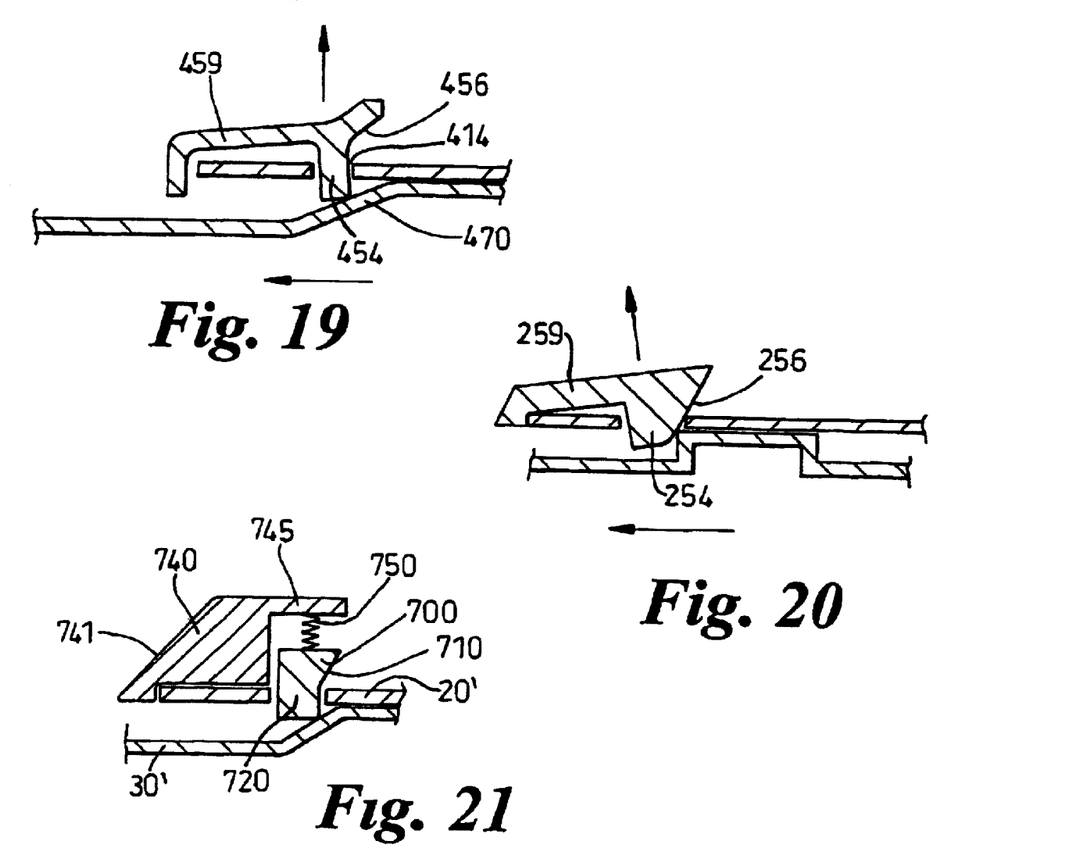

FIGS. 12 and 13 show an alternative embodiment of the wand, using similar views to those shown in FIGS. 5 and 6. As before, tubes 20' and 30' represent two adjacent stages of the wand. The main difference in this embodiment is that the collar 310 of tube 30 in FIG. 5 has been replaced by an inclined surface 470 forming part of the tube 30' and the projection 254 of FIG. 5 has been replaced by a projection 454 having a straight, radially extending face on each side rather than an inclined surface 256 on one of its sides. This alternative arrangement achieves the same function as the previous one in that, as the tube 30' is extended towards the locked position, projection 454 is moved radially outwards. Here, the movement is achieved by the inclined face 470 of tube 30' cooperating with projection 454. FIGS. 19 and 20 compare the two embodiments in more detail.

There are several other differences in the embodiment shown in FIG. 12. Tube 30' has an aperture 414 stamped in it rather than a shaped depression in the outer surface of the tube. This has been found to be simpler to manufacture. To compensate for the fact that tube 30' now has an aperture in its outer wall, seal 460 extends further, in a longitudinal direction, into the tube 30'. It can be seen that the innermost part of seal 460 abuts the inner wall of the inclined surface 470 of tube 30' and the outermost part 462 of seal 460 abuts the inner wall of tube 20'. In use, projection 454 seats itself in aperture 414 when the tubes are locked. Movement of tube 30' in either longitudinal direction is prevented by virtue of the radial faces of projection 454. This arrangement has been found to provide the user with a more positive indication of when the tubes are locked compared with the arrangement described earlier.

Figure 14:
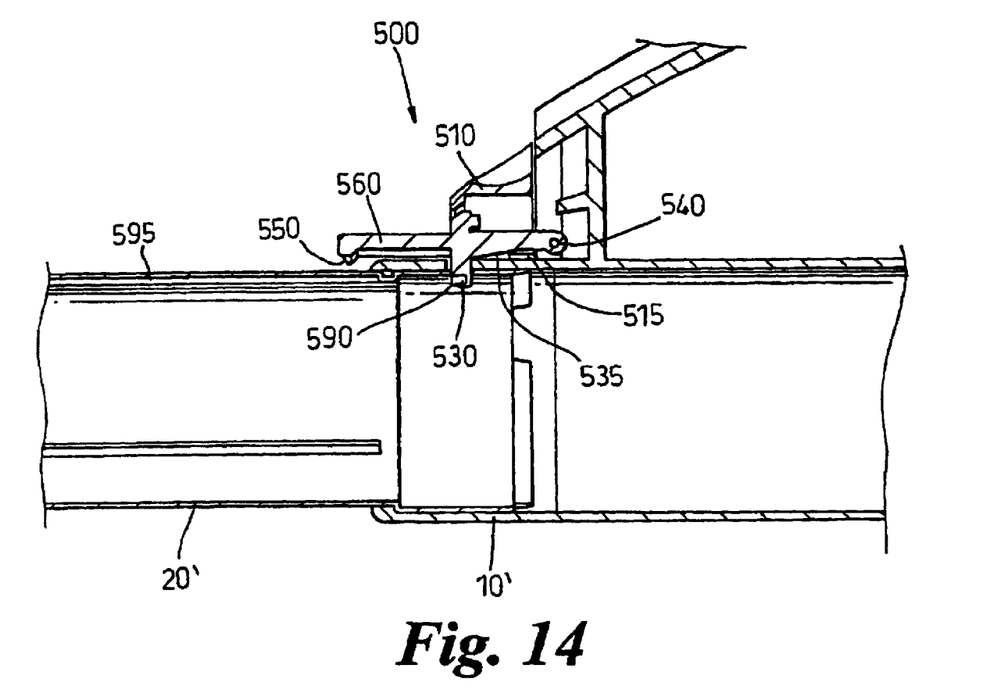
FIGS. 14 and 15 show an alternative embodiment for the locking mechanism on the storage tube of the wand.
Figure 15:
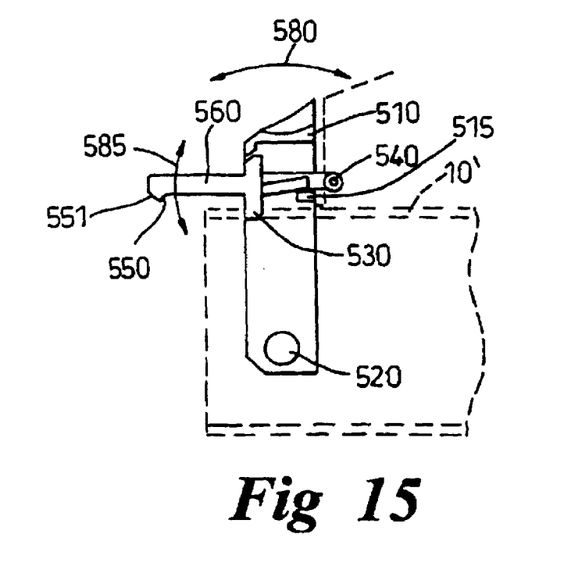

FIGS. 14 and 15 show an alternative locking mechanism 500 for the storage tube 10, shown here as 10'. FIG. 14 shows the widest tube 20', in an extended and locked position with respect to the storage tube 10'. The locking mechanism 500 comprises an actuator member 510 and a locking lever 560. Actuator member 510 is pivotally mounted about pivot 520 to the storage tube 10' and locking lever 560 is pivotally mounted about pivot 540 to another part of the storage tube 10'. Actuator member 510 carries a rib 515 which presses against an inclined surface 535 of the locking lever 560.

Figure 16:
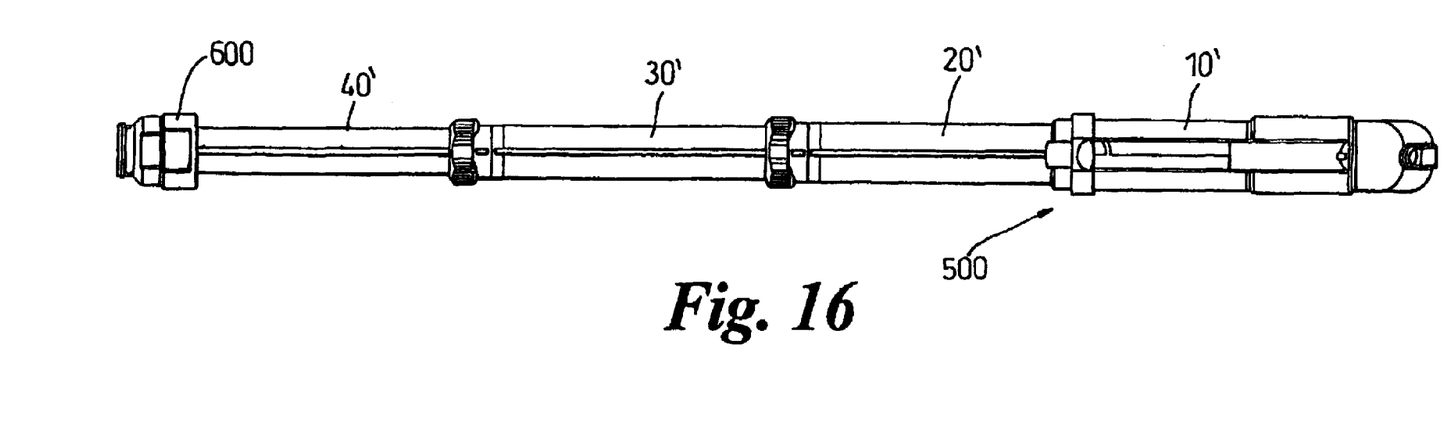
FIGS. 16 and 17 show a wand with the locking mechanism shown in FIGS. 14 and 15.
Figure 17:
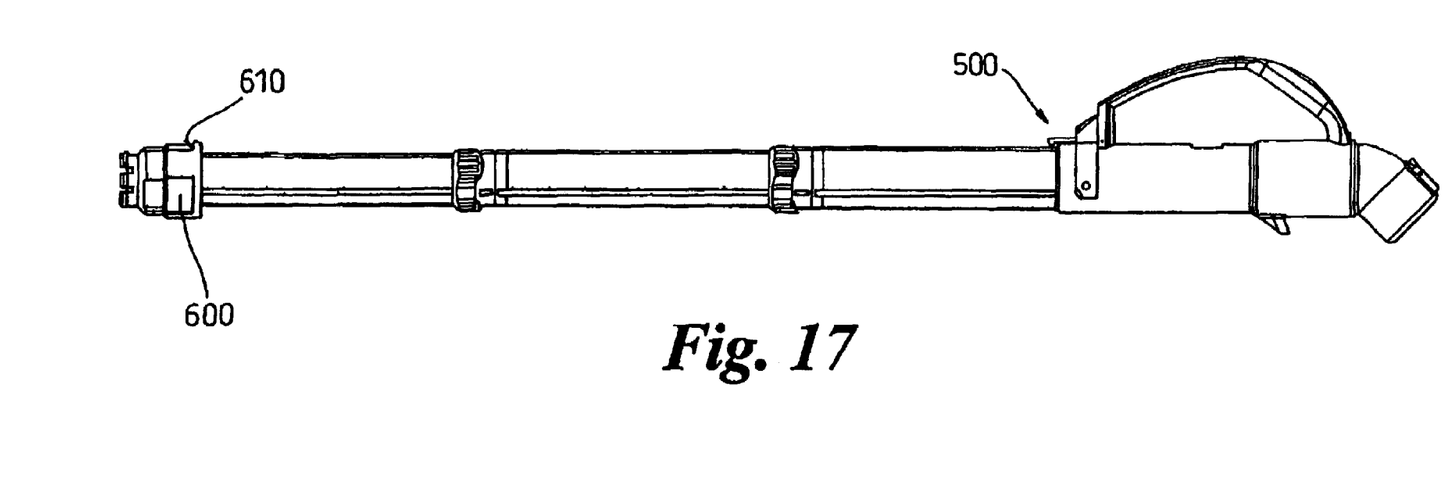
Figure 18:
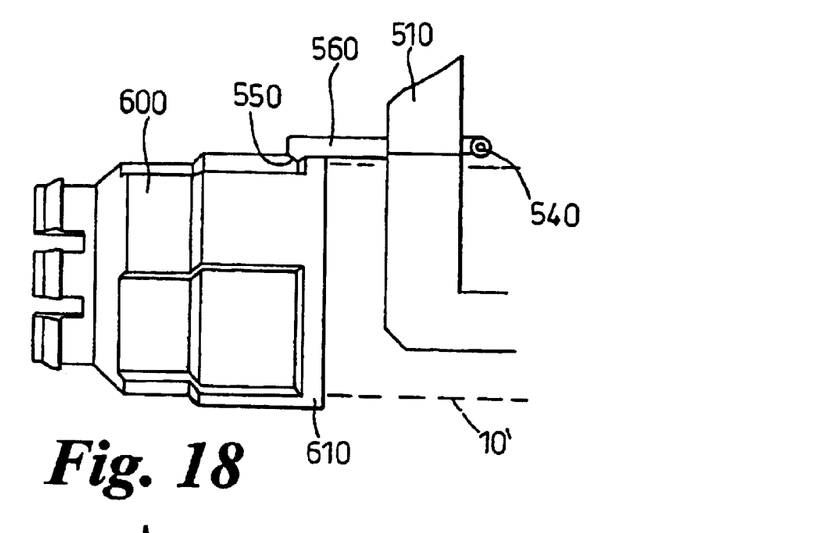
FIG. 18 shows part of the wand of FIGS. 16 and 17 in a fully retracted and locked state.

In use, movement of the actuator member 510 in the direction shown as 580 causes the rib 515 to ride along the inclined surface 535, causing the locking lever 560 to raise or lower in the direction shown as 585. Projection 530 on the locking lever 560 seats in a depression 590 in the wall of tube 20' to lock the position of tube 20'. Operating the actuator member 510 allows the projection 530 to be raised from its seated position and thus allows tube 20' to be retracted. Locking lever 530 also carries a hook 550 which can retain a collar 610 on a cap 600 on the distal end of tube 40' (see FIGS. 16 and 17). When all of the tubes have been retracted into the storage tube 10', cap 600 lies alongside the end of storage tube 10' and hook 550 can engage with collar 610. All of the tubes 20', 30', 40' are thus held securely within storage tube 10' until the actuator member 510 is operated to release the hook 550. The leading edge of hook 550 comprises an inclined face 551 which can be displaced by collar 610 as the tubes are retracted inside the storage tube 10'. This allows the hook 550 to automatically ride over the collar 610 and thus retain the cap 600 as the tubes are moved towards a stored position (shown in FIG. 18). It will be appreciated that collar 610 could be provided as part of tube 40' rather than as part of a separate fitting 600. In the stored position, cap 600 accommodates all of the securing mechanisms of the other stages, and thus serves to protect them from damage during storage.

The locking arrangement just described can work in the same manner as the arrangement just shown in FIG. 11 so as to allow the tube 20' to be locked in various extended positions. Uppermost tube 20' would be provided with a set of locking depressions of the type shown as 590 in FIG. 14. These locking positions can be provided as further notches 590 in the ridge 595 which runs along the length of tube 20'.

FIG. 21 shows a further alternative embodiment for a securing mechanism for the tubes. Here, the arms 259, 459 of the previous embodiments have been replaced by a locking part 700 which is movable in a radial direction. Locking part 700 is retained by a rearwardly extending rib 745 of a ring 740 which fits around tube 20'. A spring 750 acts between rib 745 and the locking part 700 and serves to bias the locking part 700 towards tube 30'. This embodiment works in the same manner as those described previously, and automatically assumes both a locked position and an unlocked position without manual operation by a user. In use, the inclined leading edge 741 of the collar 740 on one locking mechanism will press against the inclined surface 710 of an adjacent locking mechanism so as to automatically unlock tubes. Locking part 700 is shown with a square projection 720 but it could have an inclined face of the type shown in FIG. 19.

The wand which is shown in the drawings has three separate tubes or stages, in addition to a storage tube, but it will be appreciated that the wand could have only two stages or a higher number than three. Each additional stage would have the same type of securing mechanism as the ones shown as 25, 35 in the illustrated embodiment. While the handle has been shown as part of the storage tube, the handle could be an elbow-shaped pipe which fits inside the distal end of the storage tube, in place of section 16 shown in FIG. 1.

The invention claimed is:

1. A wand for a domestic appliance, comprising a plurality of telescoping tubes which are dimensioned to telescope inside one another so as to be movable between an extended position and a retracted stored position, a storage tube into which the telescoping tubes are retracted when in the stored position and a locking arrangement carried on the storage tube and comprising a projection configured to engage with the smallest of the plurality of telescoping tubes so as to hold the telescoping tubes together when in the stored position.

2. The wand of claim 1, wherein the storage tube carries a handle configured to allow a user to manipulate the wand.

3. The wand of claim 2, wherein the handle is carried by the storage tube on a side wall of the storage tube.

4. The wand of claim 3, wherein the handle lies alongside the storage tube and does not project beyond an end of the storage tube.

5. The wand of claim 1, 2 or 3, wherein the telescoping tubes have lengths so that, when the telescoping tubes are in the stored position, each respective telescoping tube fully occupies the length of the storage tube available to said telescoping tube.

6. The wand of claim 5, further comprising seals configured to seal each telescoping tube against another telescoping tube or against the storage tube.

7. The wand of claim 6, wherein the wand is adapted to be connected to a vacuum cleaner.

8. The wand of claim 5, comprising three telescoping tubes.

9. The wand of claim 5, wherein the wand is adapted to be connected to a vacuum cleaner.

10. The wand of claim 1, 2 or 3, further comprising securing mechanisms provided between adjacent telescoping tubes so as to permit selective locking of the telescoping tubes to one another or to allow free movement between the telescoping tubes.

11. The wand of claim 10, further comprising a further securing mechanism provided between the storage tube and an adjacent telescoping tube.

12. The wand of claim 11, wherein, in the stored position, the securing mechanisms lie adjacent one another.

13. The wand of claim 11, further comprising seals configured to seal each telescoping tube against another telescoping tube or against the storage tube.

14. The wand of claim 11, comprising three telescoping tubes.

15. The wand of claim 11, wherein the wand is adapted to be connected to a vacuum cleaner.

16. The wand of claim 10, wherein, in the stored position, the securing mechanisms lie adjacent one another.

17. The wand of claim 10, further comprising seals configured to seal each telescoping tube against another telescoping tube or against the storage tube.

18. The wand of claim 10, comprising three telescoping tubes.

19. The wand of claim 10, wherein the wand is adapted to be connected to a vacuum cleaner.

20. The wand of claim 1, 2 or 3, further comprising seals configured to seal each telescoping tube against another telescoping tube or against the storage tube.

21. The wand of claim 20, comprising three telescoping tubes.

22. The wand of claim 20, wherein the wand is adapted to be connected to a vacuum cleaner.

23. The wand of claim 1, 2 or 3, comprising three telescoping tubes.

24. The wand of claim 1, 2 or 3, wherein the wand is adapted to be connected to a vacuum cleaner.

* * * * *